United States Patent
Park et al.

(10) Patent No.: US 11,408,833 B2
(45) Date of Patent: Aug. 9, 2022

(54) VEHICLE AND METHOD OF MANAGING CLEANLINESS OF INTERIOR OF THE VEHICLE

(71) Applicants: Hyundai Motor Company, Seoul (KR); Kia Motors Corporation, Seoul (KR)

(72) Inventors: Min Jae Park, Gyeonggi-do (KR); Seung Hyun Woo, Seoul (KR); Anastasia Yarygina, Seoul (KR); Edvin Eriksen, Berlin (DE)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 63 days.

(21) Appl. No.: 17/109,518

(22) Filed: Dec. 2, 2020

(65) Prior Publication Data
US 2021/0372942 A1 Dec. 2, 2021

(30) Foreign Application Priority Data
Jun. 2, 2020 (KR) .................. 10-2020-0066564

(51) Int. Cl.
*G01N 21/94* (2006.01)
*G06V 10/20* (2022.01)
*G06V 20/59* (2022.01)

(52) U.S. Cl.
CPC .......... *G01N 21/94* (2013.01); *G06V 10/255* (2022.01); *G06V 20/59* (2022.01); *G01N 2201/0216* (2013.01)

(58) Field of Classification Search
CPC .......... G06T 2207/30268; G06T 5/009; G06T 2207/30248; G06T 2207/30252;
(Continued)

(56) References Cited

U.S. PATENT DOCUMENTS

2017/0076463 A1*  3/2017  Nishijima ............. G06T 7/0002
2017/0113512 A1*  4/2017  Park ...................... G06V 40/18
(Continued)

FOREIGN PATENT DOCUMENTS

CN    105445808 A  *  3/2016  ............. G01B 7/003
CN    110738338 A  *  1/2020  ........... G06F 3/0484
(Continued)

*Primary Examiner* — Dung Hong
(74) *Attorney, Agent, or Firm* — Fox Rothschild LLP

(57) ABSTRACT

A vehicle and a method of managing cleanliness of an interior of the vehicle that are capable of detecting whether the interior of the vehicle has been contaminated and managing detection information. The method of managing the cleanliness of the interior of the vehicle includes detecting indoor contamination using a contamination detector including at least a camera, analyzing indoor cleanliness based on the result of the detecting, and outputting guidance information based on the analyzed indoor cleanliness. The detecting the indoor contamination includes detecting at least one object in an indoor region of the vehicle subjected to contamination detection and detecting whether contamination has occurred in the indoor region subjected to contamination detection other than a region in which the at least one object is detected.

20 Claims, 9 Drawing Sheets

(58) Field of Classification Search
CPC .... G06T 7/0008; G06V 20/59; G06V 10/255; G06V 10/20; G06V 20/593
See application file for complete search history.

(56) References Cited

U.S. PATENT DOCUMENTS

| | | | |
|---|---|---|---|
| 2017/0278312 A1* | 9/2017 | Minster | G05D 1/0297 |
| 2018/0307926 A1* | 10/2018 | Tokatyan | G06V 20/59 |
| 2018/0330475 A1* | 11/2018 | Tokatyan | G06T 7/001 |
| 2019/0303999 A1* | 10/2019 | Hori | G06Q 50/30 |
| 2020/0050858 A1* | 2/2020 | Jung | G06V 20/20 |
| 2020/0301418 A1* | 9/2020 | Dingli | B60W 50/023 |

FOREIGN PATENT DOCUMENTS

| | | | | |
|---|---|---|---|---|
| DE | 102013001332 A1 * | 7/2014 | | G01N 21/94 |
| DE | 102016215525 A1 * | 2/2018 | | B08B 1/002 |
| DE | 102018212456 A1 * | 1/2020 | | |
| EP | 1962254 A2 * | 8/2008 | | G06K 9/00791 |
| EP | 3546301 A1 * | 10/2019 | | B60R 1/00 |
| JP | 2020079994 A * | 5/2020 | | |
| KR | 20170049917 A1 * | 5/2017 | | G06Q 50/30 |
| WO | WO-2018230532 A1 * | 12/2018 | | G06Q 50/10 |
| WO | WO-2019032097 A1 * | 2/2019 | | B64C 39/024 |
| WO | WO-2020115970 A1 * | 6/2020 | | B60S 5/00 |
| WO | WO-2020153501 A * | 7/2020 | | B60Q 1/50 |
| WO | WO-2020158340 A1 * | 8/2020 | | |

* cited by examiner (a)

(b)

| ICON DISPLAY | | | |
|---|---|---|---|
| TYPE OF CONTAMINANT | SEVERITY OF ODOR | URGENT Y/N | SIZE |
| LIQUID<br><br>SOLID | ⸹<br>⸹⸹<br>⸹⸹⸹ | ⚠ | SIZE OF ICON IS CHANGEABLE DEPENDING ON SIZE OF CONTAMINANT |

(a)

(b)

VEHICLE AND METHOD OF MANAGING CLEANLINESS OF INTERIOR OF THE VEHICLE

This application claims under 35 U.S.C. § 119(a) the benefit of Korean Patent Application No. 10-2020-0066564, filed on Jun. 2, 2020, the entire contents of which are incorporated by reference herein.

BACKGROUND

(a) Technical Field

The present disclosure relates to a vehicle and a method of managing cleanliness of an interior of the vehicle that are capable of detecting whether the interior of the vehicle has been contaminated and managing detection information.

(b) Description of the Related Art

While a vehicle is traveling, an object present in an interior of the vehicle is subjected to inertial force due to changes in a road surface or acceleration/deceleration of the vehicle. For this reason, in many cases, an object that may cause contamination, such as food, spills and soils a seat or a mat of the vehicle. In the case in which indoor contamination occurs in a privately owned vehicle, the vehicle owner may freely determine whether or not to clean the vehicle. However, in recent years, the concept of vehicle sharing, rather than individual ownership, has expanded due to the advantages of cost savings and utilization efficiency, and thus vehicle sharing and related service markets are expected to maintain high growth. Accordingly, the need to manage cleanliness of the interior of the vehicle is particularly important for shared vehicles.

In a vehicle-sharing service, many different people use one vehicle. Most users have little or no sense of ownership over a shared vehicle, unlike a privately owned vehicle, and thus pay little attention to indoor contamination while using the shared vehicle. Therefore, in many cases, at the end of use thereof, a vehicle is returned dirty with the interior soiled, and is handed over to the next user with the interior thereof in an uncleaned state, which causes dissatisfaction with service quality.

SUMMARY

Accordingly, the present disclosure is directed to a vehicle and a method of managing cleanliness of an interior of the vehicle that substantially obviate one or more problems due to limitations and disadvantages of the related art.

An object of the present disclosure is to provide a vehicle and a method of managing cleanliness of an interior of the vehicle that are capable of more effectively detecting whether the interior of the vehicle has been contaminated (i.e., made dirty) and informing an occupant of the detection result.

In addition, another object of the present disclosure is to provide a vehicle and a method of managing the cleanliness of the interior of the vehicle that are capable of inducing an occupant to clean the vehicle based on information on the detected contamination.

However, the objects to be accomplished by the embodiments are not limited to the above-mentioned objects, and other objects not mentioned herein will be clearly understood by those skilled in the art to which the embodiments pertain from the following description.

In order to accomplish the above and other objects, a method of managing the cleanliness of the interior of a vehicle according to an embodiment of the present disclosure may include detecting indoor contamination using a contamination detector including at least a camera, analyzing indoor cleanliness based on the result of the detecting, and outputting guidance information based on the analyzed indoor cleanliness. The detecting the indoor contamination may include detecting at least one object in an indoor region of the vehicle subjected to contamination detection and detecting whether contamination has occurred in the indoor region subjected to contamination detection other than a region in which the at least one object is detected.

In addition, a device for managing the cleanliness of the interior of a vehicle according to an embodiment of the present disclosure may include a contamination detector including at least a camera, a controller configured to determine indoor contamination based on information acquired through the contamination detector and to analyze indoor cleanliness based on the result of determination, and an output unit configured to output guidance information based on the analyzed indoor cleanliness. The controller may detect at least one object in an indoor region of the vehicle subjected to contamination detection and may determine whether contamination has occurred in the indoor region subjected to contamination detection other than a region in which the at least one object is detected.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION OF THE DISCLOSURE

Figure 1:
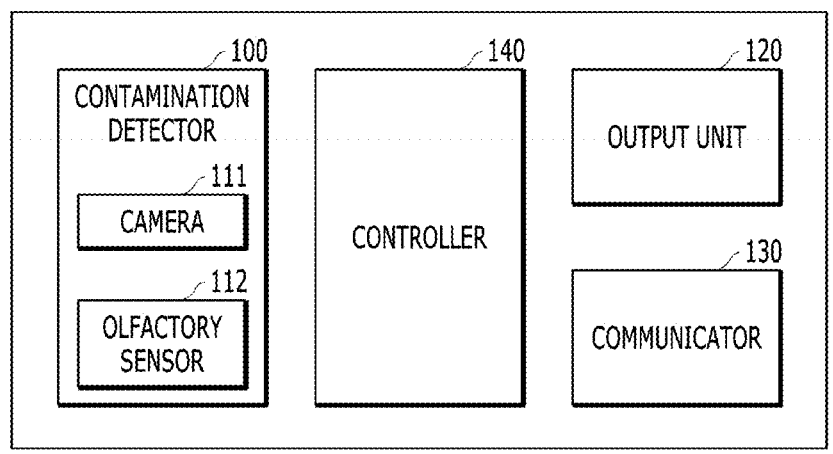
FIG. 1 shows an example of the structure of a device for managing cleanliness of an interior of a vehicle to which embodiments of the present disclosure are applicable.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, embodiments of the present disclosure will be described in detail with reference to the accompanying drawings so that those skilled in the art may easily carry out the embodiments. The present disclosure may, however, be embodied in many different forms, and should not be construed as being limited to the embodiments set forth herein. In the drawings, parts irrelevant to the description of the present disclosure will be omitted for clarity. Like reference numerals refer to like elements throughout the specification.

The same reference numerals used throughout the specification refer to the same constituent elements.

An embodiment of the present disclosure proposes technology for detecting and analyzing the cleanliness of an interior of a vehicle in various manners and outputting guidance information based thereon.

FIG. 1 shows an example of the structure of a device for managing cleanliness of an interior of a vehicle to which embodiments of the present disclosure are applicable.

Referring to FIG. 1, the device for managing the cleanliness of the interior of the vehicle to which embodiments of the present disclosure are applicable may include a contamination detector 110, which detects whether the interior of the vehicle has been contaminated, an output unit 120, which outputs guidance information, a communicator 130, which performs communication with an internal device and an external device of the vehicle so as to exchange data therewith, and a controller 140, which performs overall control of the aforementioned components.

The contamination detector 110 may include a camera 111 for acquiring an image of the interior of the vehicle in order to detect contamination based on image information and an olfactory sensor 112 for detecting contamination through smell. The camera 111 may include a plurality of cameras depending on the area of the interior that is subjected to contamination detection and on the contamination detection method. For example, the cameras may be disposed at a region near the rear-view mirror in order to photograph front seats and surroundings thereof (e.g., a driver's seat, a front passenger seat, a dashboard, etc.) and at a center or a rear end portion of a roof in order to photograph rear seats and surroundings thereof (e.g., rear passenger seats, a lower end region of a rear glass, etc.), without being limited thereto. The position and number of cameras are not limited, so long as it is possible to effectively photograph an indoor region of the vehicle that is being subjected to contamination detection. Similarly, a position and number of olfactory sensors 112 are not limited.

At least one of a general RGB-type camera, an infrared (IR) camera, a stereo camera for capturing a three-dimensional (3D) image, or a camera equipped with a spectroscopic sensor may be used as the camera 111 in order to detect an object and contamination, which will be described later.

The output unit 120 may output guidance information in various forms. For example, the output unit 120 may include a display to output guidance information in the form of visual information, or may include a speaker to output guidance information in the form of acoustic information. The display may include a display of a head unit or a display disposed in a cluster. However, the display is not limited to any specific form, so long as it is capable of visually outputting guidance information.

The communicator 130 may include at least one of a wired communicator (not shown), through which the vehicle cleanliness management device communicates with other entities (e.g., control units) mounted in the vehicle, or a wireless communicator (not shown), through which the vehicle cleanliness management device communicates with entities (e.g., an external server, a smart device carried by an occupant, etc.) other than the corresponding vehicle. The wired communicator may support one or more protocols that are applicable to predetermined vehicle network communication, such as CAN, CAN-FD, LIN, and Ethernet, without being limited thereto. The wireless communicator may support at least one of short-range communication (e.g., Bluetooth, Wi-Fi, Wi-Di, ZigBee, NFC, etc.) for communication with a smart device carried by an occupant, telematics, or cellular-based communication (e.g., 3G, LTE, 5G, etc.).

Upon detecting preparation or commencement of movement of the vehicle through the communicator 130, the controller 140 may obtain information for determination of the indoor cleanliness from the contamination detector 110 to analyze the indoor cleanliness, and may output guidance information corresponding to the analysis result through the output unit 120. In addition, the controller 140 may transmit information corresponding to the analysis result to an external entity, such as a vehicle-sharing service server, a telematics server, or a terminal carried by an occupant, through the communicator 130.

Hereinafter, a process of managing the cleanliness of the interior of a vehicle will be described in detail on the basis of the configuration of the vehicle cleanliness management device described above.

Figure 2:
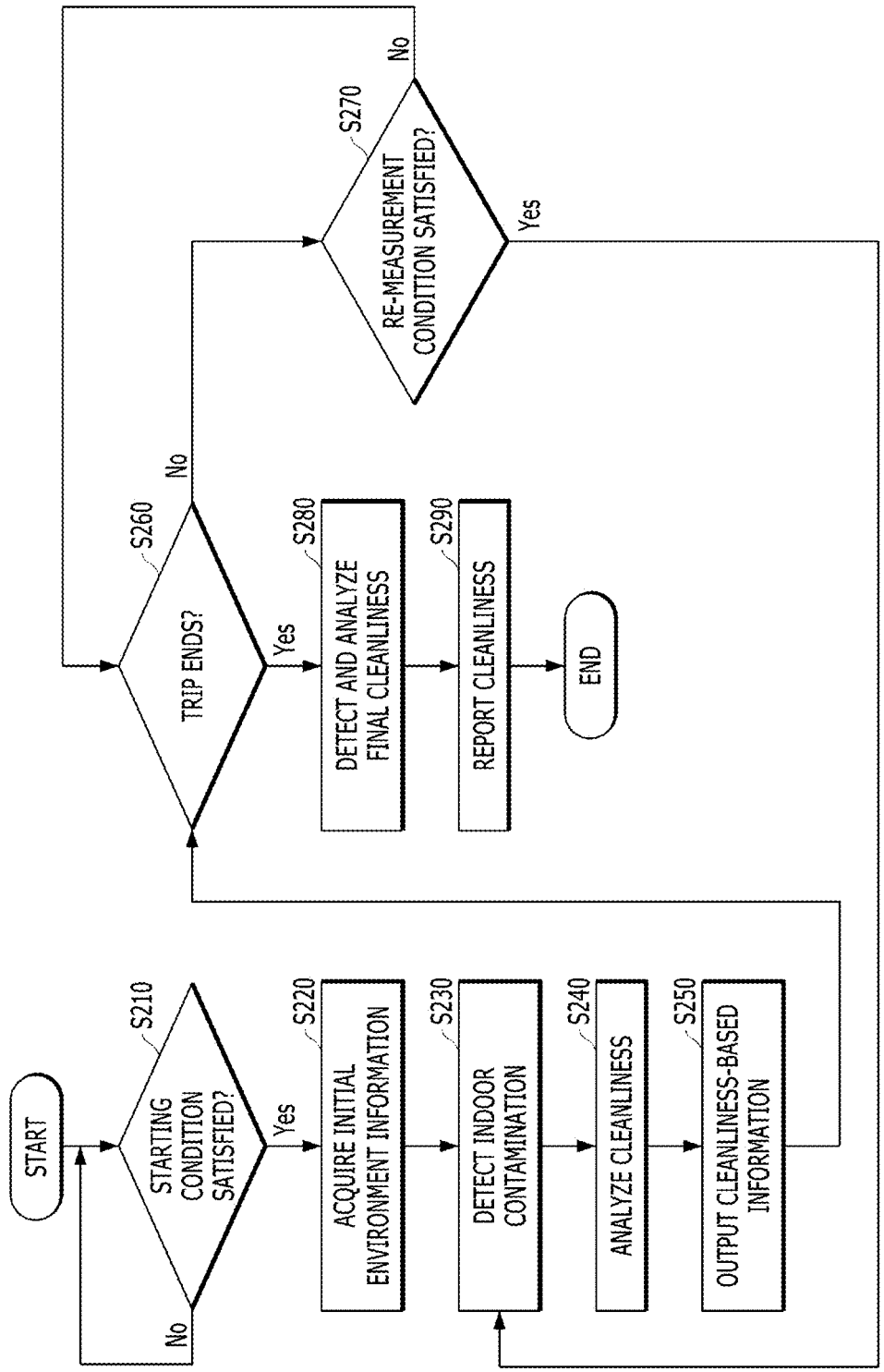
FIG. 2 is a flowchart showing an example of a process of managing cleanliness of an interior of a vehicle according to an embodiment of the present disclosure.

FIG. 2 is a flowchart showing an example of a process of managing cleanliness of an interior of a vehicle according to an embodiment of the present disclosure.

Referring to FIG. 2, the controller 140 may determine whether a starting condition is satisfied (S210). For example, the starting condition may be satisfied when notification is received from a vehicle-sharing service server that the vehicle is assigned to the next user, when the door of the vehicle is unlocked after the end of the previous trip, or when the vehicle is started, without being limited thereto.

When the starting condition is satisfied (Yes in S210), initial environment information may be acquired (S220). Here, the initial environment information may be information on the state of the interior of the vehicle before the user starts to use the vehicle. For example, the initial environment information may be information on the state of the interior of the vehicle when the vehicle is shipped, information on the state before the current user starts to drive the vehicle after the end of the last use thereof, or information on the state before contamination occurs after the current user gets in the vehicle. Thus, this step may be performed in the manner of acquiring an image for determination of the vehicle interior material, the location of basic in-vehicle items, and the color of the seats and mats through the camera 111 and detecting the odor of the interior before contamination through the olfactory sensor 112. In another embodiment, this step may be performed in the manner of acquiring default initial environment information from a vehicle-sharing service server. In still another embodiment, this step may be omitted.

Subsequently, indoor contamination detection may be performed through the contamination detector 111 in order to determine the cleanliness of the interior of the vehicle (S230), and the controller 140 may analyze the cleanliness based on the detection information (S240). A detailed description of the detection process S230 will be made later with reference to FIGS. 3 to 6. The cleanliness may be analyzed in the following manner. The cleanliness may be analyzed on the basis of the classification and location of contamination.

TABLE 1

| Type of Contaminant | Size of Contaminated Region | Difference between Color of Contaminated Region and Original Color | Material Property | Severity of Odor |
|---|---|---|---|---|
| Liquid | 30 cm or Greater | Large Difference | High Viscosity | High |
| Solid | 5 to 30 cm | Intermediate Difference | Low Viscosity | Intermediate |
|  | Less than 5 cm | Small Difference | No Viscosity | No Odor (Dry) |

As can be seen from Table 1, the contamination may be classified on the basis of the type of contaminant, the size of the contaminated region, the difference between the color of the contaminated region and the original color, the material property (viscosity), and the severity of odor. The cleanliness may be given different scores (or weights) depending on the classification of each item. For example, if the size of the contaminated region is 30 cm or greater, the color difference is large, and the severity of odor is high, the cleanliness may be determined to be very low, and if the size of the contaminated region is less than 5 cm, the color difference is small, and there is no odor, the cleanliness may be determined to be very high.

TABLE 2

| Material of Contaminated Region | Elapsed Time since Contamination Discovery |
|---|---|
| Leather | 60 Minutes or more |
| Fabric | 30 to 60 Minutes |
| Plastic | 10 to 30 Minutes |
| Metal | Within 10 Minutes |

As can be seen from Table 2, the cleanliness may be weighted differently depending on the material of the contaminated region and the contamination time period for each material. For example, in the case of metal, which is relatively resistant to contamination, the cleanliness may not be greatly lowered even when a large amount of time passes after contamination. However, in the case of fabric, which is susceptible to contamination, the cleanliness may be weighted strongly so as to be greatly lowered even when a small amount of time passes after contamination.

In summary, the controller 140 may give a cleanliness score to each item shown in Tables 1 and 2 such that the cleanliness score gradually increases from the uppermost criterion of each item to the lowermost criterion thereof, and may determine the cleanliness by summing the scores given to the respective items. However, this is merely illustrative, and it will be apparent to those skilled in the art that the items/criteria shown in Tables 1 and 2 and the weights given thereto may be variously set.

Upon determining that the interior of the vehicle is contaminated based on the cleanliness analysis result, the controller 140 may output guidance information about the indoor contamination through the output unit 120 (S250). A concrete form in which the guidance information is output will be described later with reference to FIGS. 7 to 9.

The controller 140 may determine whether a re-measurement condition is satisfied (S270) until the end of the trip (No in S260), and may repeatedly detect and analyze the indoor cleanliness when the re-measurement condition is satisfied (Yes in S270). Here, the re-measurement condition may be satisfied when a predetermined amount of time has passed since the last cleanliness analysis, when cleanliness-based guidance indicating that immediate cleaning is required is output, when the contamination level continues to increase at every re-measurement, when at least one of the objects that had been detected previously has disappeared, or when there is a change in occupants through opening of the door, without being limited thereto. For example, among the re-measurement conditions, in the case in which at least one of the objects (including the occupants) that had been detected previously has disappeared, the cleanliness of the region that was hidden or covered by the object that has disappeared may be re-measured.

When the trip ends (Yes in S260), the controller 140 may detect and analyze the final cleanliness through the contamination detector 110 (S280), and may report the analysis result to the outside through the communicator 130 (S290). In some embodiments, when the process of detecting and analyzing the final cleanliness is not separately performed, the most recently analyzed cleanliness information may be reported. The entity to which the cleanliness information is reported may be at least one of a vehicle-sharing service server, a preset cleaning management company server, a telematics center, or a smart device carried by the occupant. When the vehicle-sharing service server receives the cleanliness report, it may assign benefits or a penalty to the last user based on the cleanliness report. When the cleaning management company server receives the cleanliness report, it may determine whether to dispatch cleaning personnel. In addition, the cleanliness report may be transmitted to a smart device carried by the last user in order to warn of the possibility of imposing a penalty on the last user, thereby inducing the last user to return to the vehicle and clean the vehicle. In addition, the cleanliness report transmitted to a smart device carried by the last user may include information indicating that an object that is not a contaminant (i.e., a lost article) was left behind in the vehicle so that the last user may pick up the object immediately.

Hereinafter, the cleanliness detection process will be described in greater detail with reference to FIGS. 3 to 6.

Figure 3:
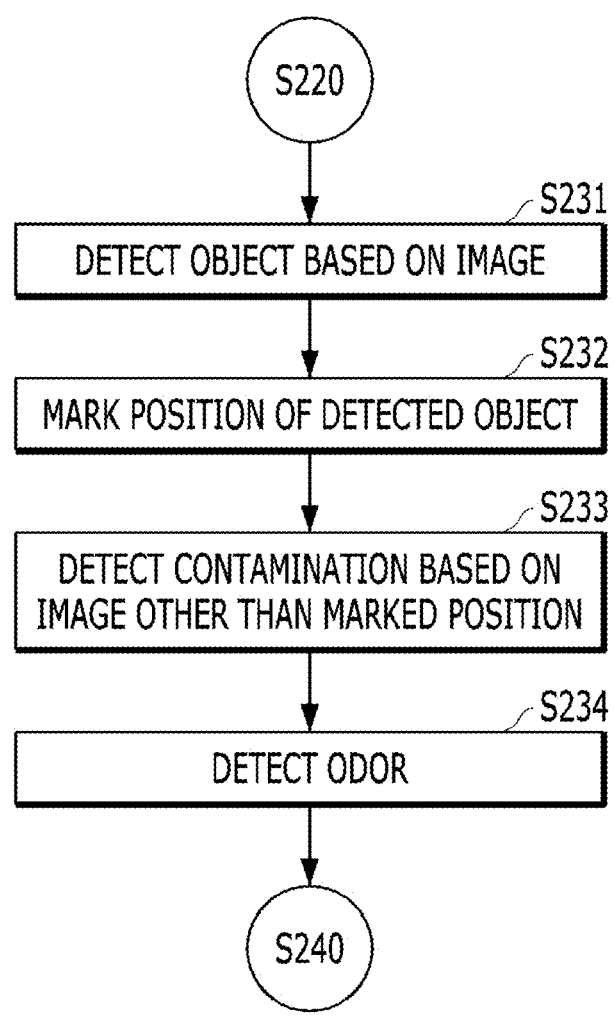
FIG. 3 is a flowchart showing an example of the manner in which the indoor cleanliness detection process of FIG. 2 is performed.

FIG. 3 is a flowchart showing an example of the manner in which the indoor cleanliness detection process of FIG. 2 is performed.

Referring to FIG. 3, in order to detect the indoor cleanliness, object detection may be performed based on an image captured by the camera 111 (S231). The object detection may be a process of detecting an object that was not present in the initial state through object detection logic in an image captured by an RGB camera or a stereo camera. In this case, the controller 140 may directly perform the object detection using preset artificial intelligence (AI) logic, or may transmit an image acquired through the camera 111 to an external server through the communicator 130 and may receive an object detection result from the external server. In addition, in order to detect an object that was not present in the initial state, the controller 140 may compare the currently acquired image with the initial environment information.

Since the present disclosure is not limited to any specific object detection logic, a description of a concrete algorithm of the object detection logic will be omitted.

When at least one object is detected to be present in the interior of the vehicle through the object detection process (S231), the controller 140 may mark (i.e., record) the position at which the corresponding object is detected (S232).

In addition, the controller 140 may detect whether the interior of the vehicle has been contaminated based on an image captured by the camera 111 (S233). In this case, the indoor region that is being subjected to contamination detection may be a region other than the region in which an object is detected. The reason for this is to prevent the object itself from being mistaken as contamination. As a contamination detection method, a method of determining whether the inherent color of molecules of indoor components differs from the initial environment information using a spectroscopic sensor may be applied. For example, if both the wavelength corresponding to the inherent color of a leather seat and the wavelength corresponding to another color are detected, it may be determined that the leather seat has been contaminated. In addition, if the reflectivity of a certain part in an image captured by an RGB camera or an IR camera increases, it may be determined that the part has been contaminated by liquid. Apart from the above contamination detection methods, any other contamination detection method may be applied, so long as it is possible to determine contamination through image analysis or optical analysis.

In addition, in order to detect the indoor cleanliness, odor detection may be performed using the olfactory sensor 112 (S234). Although the odor detection process is illustrated in FIG. 3 as being performed in the final stage, it may be performed prior to the image-based detection process, or may be performed simultaneously therewith.

Figure 4:
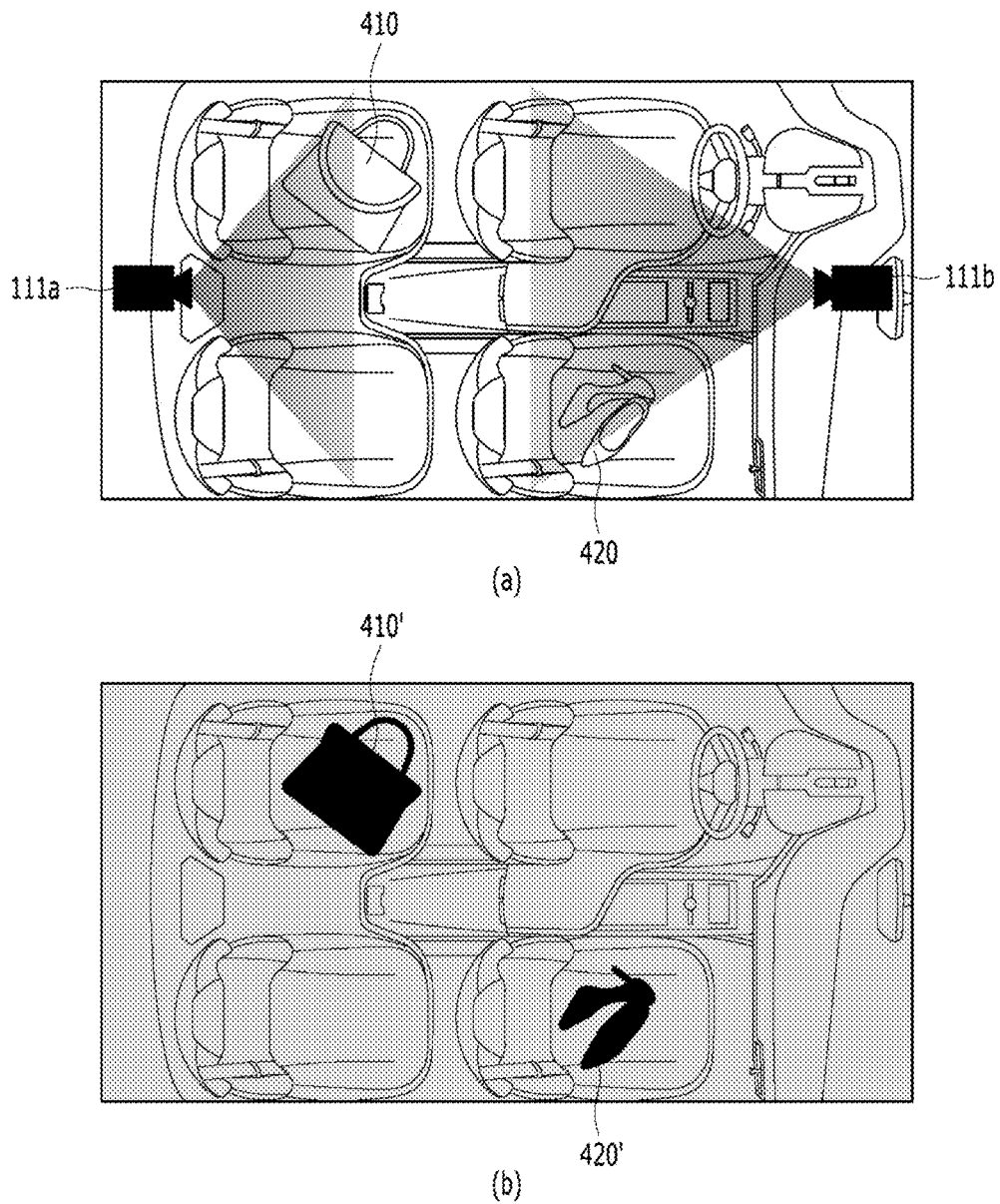
FIG. 4 shows an example of the manner in which image-based object detection is performed according to an embodiment of the present disclosure.

FIG. 4 shows an example of the manner in which image-based object detection is performed according to an embodiment of the present disclosure.

In FIG. 4 and other figures as described below, it is assumed that the camera 111 mounted in the interior of the vehicle includes a camera 111a disposed at a region near the rear seats in order to photograph the rear seats and the surroundings thereof and a camera 111b disposed at a region near the front seats in order to photograph the front seats and the surroundings thereof.

Referring to FIG. 4(a), an object 410 present on the rear seat behind the driver's seat and an object 420 present on the front passenger seat may be detected through the image-based detection process. The controller 140, as shown in FIG. 4(b), may mark positions 410' and 420' at which the objects 410 and 420 are respectively detected so that the positions 410' and 420' are excluded from the region that is subjected to contamination detection when the image-based contamination detection process is performed.

Figure 5:
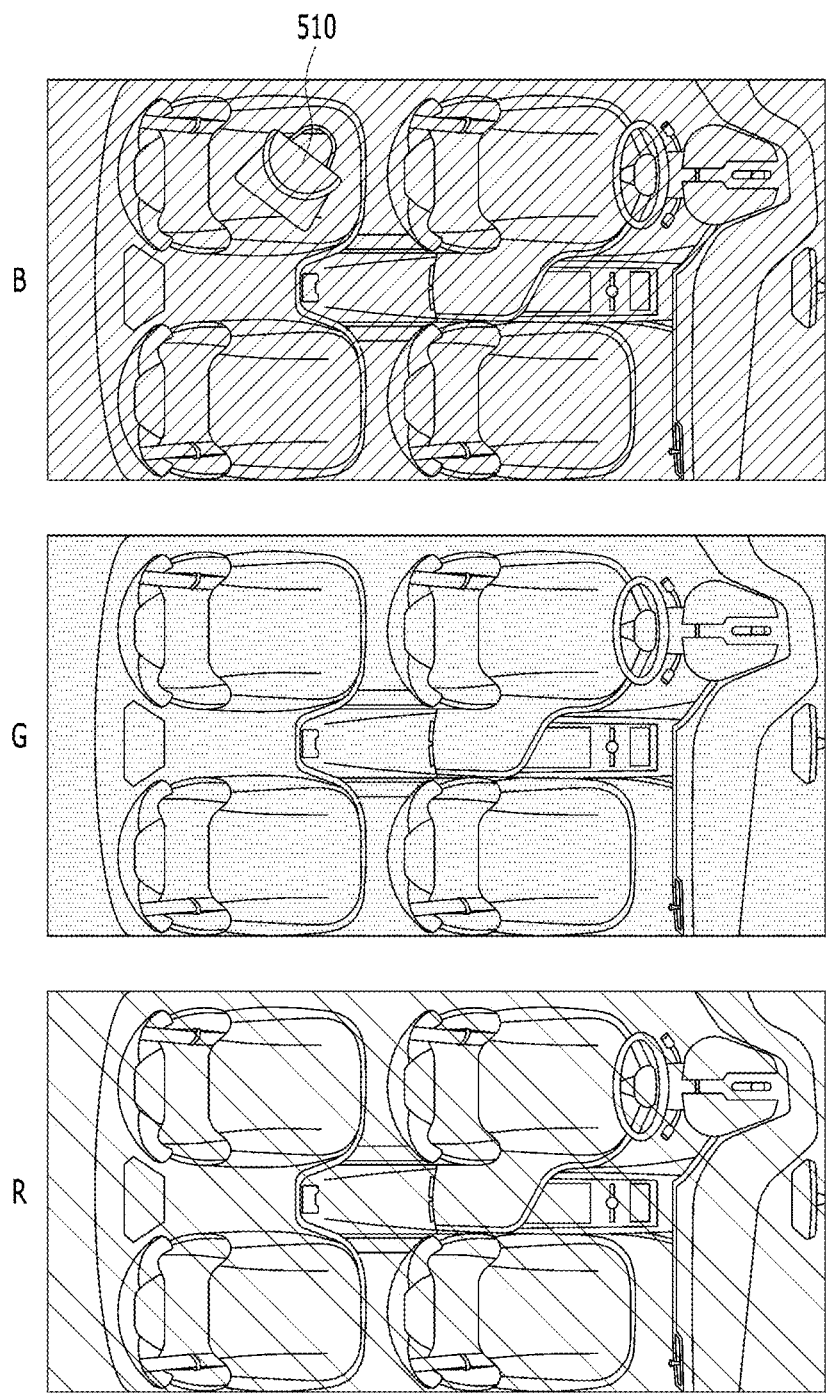
FIG. 5 shows an example of the manner in which image-based contamination detection is performed according to an embodiment of the present disclosure.

FIG. 5 shows an example of the manner in which image-based contamination detection is performed according to an embodiment of the present disclosure.

FIG. 5 shows an example of an image captured in order to apply a spectroscopy technique to each RGB color region. Here, if there is a region 510 in which a wavelength different from that of the initial environment information is detected, the region 510 may be recognized as a contaminated region. Similar to the detection process of FIG. 4, if an object 410 is detected on the rear seat behind the driver's seat, the region 510 is excluded from the region that is subjected to contamination detection, and thus the difference between the wavelength detected in the region 510 and the initial environment information may be ignored.

Figure 6:
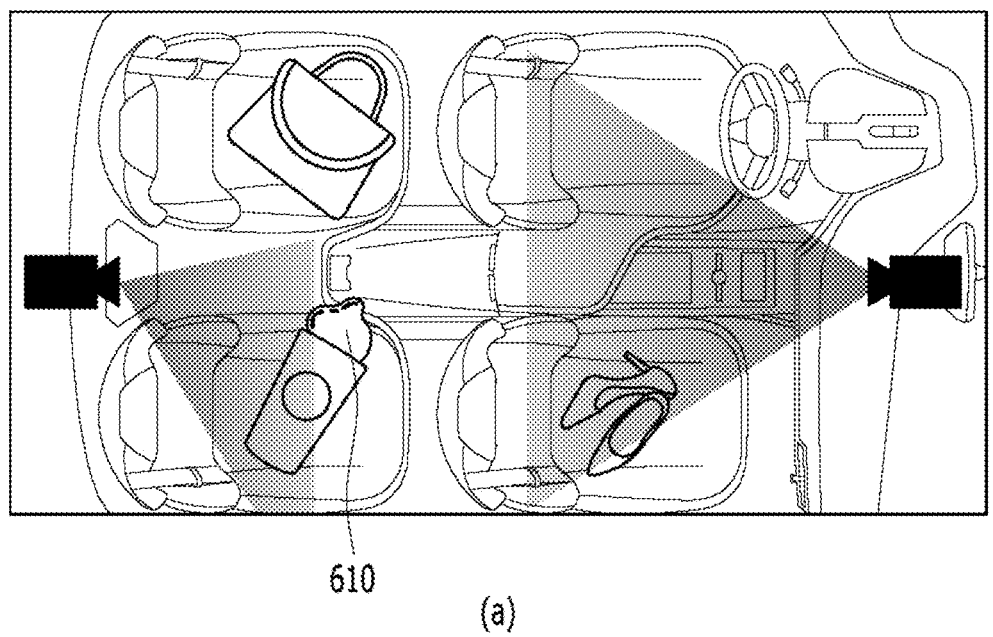
FIG. 6 shows an example of the manner in which image-based contamination tracking is performed according to an embodiment of the present disclosure.
Figure 6:
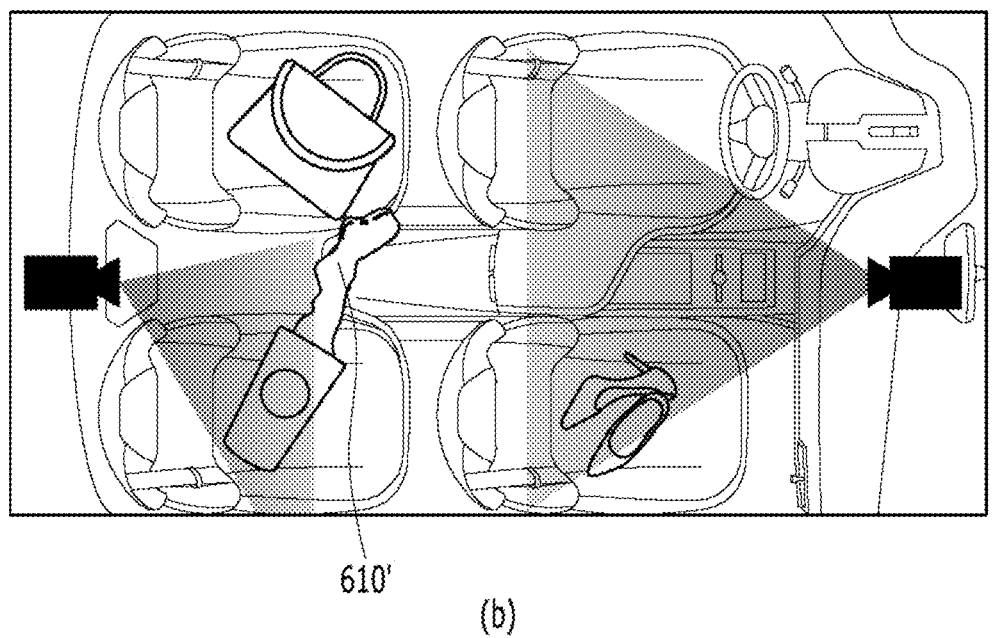

FIG. 6 shows an example of the manner in which image-based contamination tracking is performed according to an embodiment of the present disclosure.

Referring to FIG. 6(a), a contaminated region 610 may be detected in the cleanliness detection process. Thereafter, when the re-measurement condition is satisfied (Yes in S270) and the indoor cleanliness is detected again, if it is detected that the contamination of the region 610 has expanded, as indicated by reference numeral 610' in FIG. 6(b), the controller 140 may determine that the contamination level has increased.

Hereinafter, a form in which the guidance information is output will be described with reference to FIGS. 7 to 9.

Figure 7:
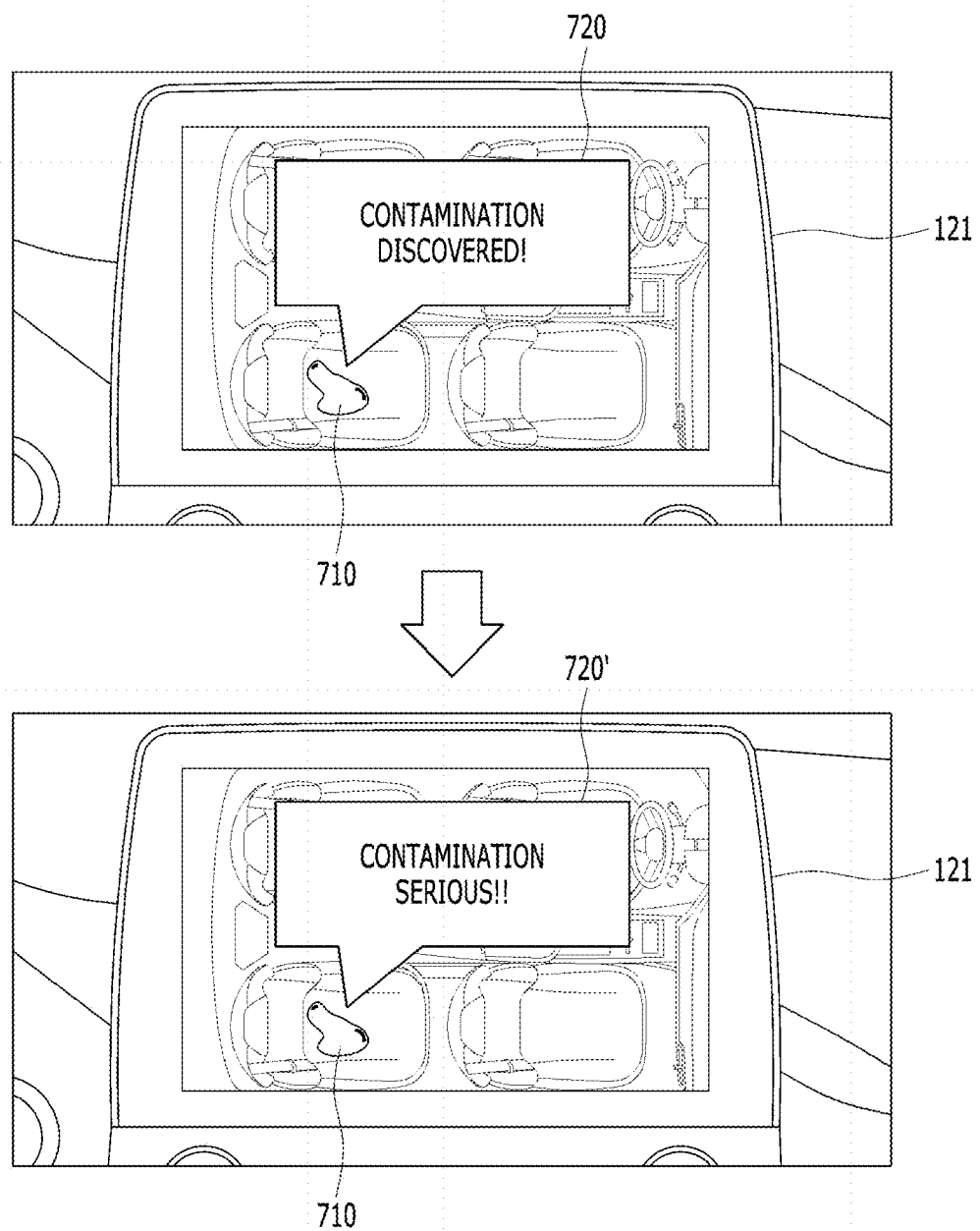
FIG. 7 shows an example of the form in which cleanliness-based guidance information is output according to an embodiment of the present disclosure.

FIG. 7 shows an example of the form in which cleanliness-based guidance information is output according to an embodiment of the present disclosure.

Referring to the upper drawing in FIG. 7, when the controller 140 determines that the indoor cleanliness level determined thereby is equal to or less than a predetermined level, the controller 140 may output guidance information corresponding to the determination through a display 121 of the head unit. Here, the guidance information may include at least one of a display object 710 or text 720, which indicates a contaminated region and the degree of contamination.

When the determined cleanliness is very low or when the size of the contaminated region is increasing as shown in FIG. 6, the controller 140 may change the form of at least some of the guidance information. For example, as shown in the lower drawing in FIG. 7, the content and the color of the text 720' may be changed, but this is merely illustrative.

Various types of visual effects may be provided depending on the cleanliness or a change in the size of the contaminated region.

The above-described guidance information may disappear when a predetermined amount of time passes after the output thereof or when it is determined at the next detection and analysis of cleanliness that the cleanliness has increased above a predetermined level. However, the present disclosure is not limited thereto.

As shown in FIG. 7, in the case in which the guidance information includes an icon-type display object 710, which indicates the occurrence of contamination, the icon may be changed so as to indicate the state of contamination. This will be described below with reference to FIG. 8.

Figure 8:
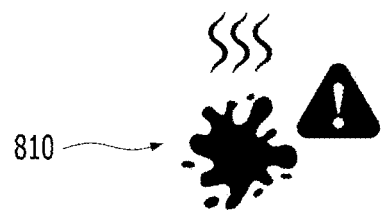
FIG. 8 shows an example of contamination guidance information according to an embodiment of the present disclosure.

FIG. 8 shows an example of the contamination guidance information according to an embodiment of the present disclosure.

Referring to FIG. 8(a), the shape of a main icon may be determined depending on the type of contaminant, and a first auxiliary icon indicating the severity of odor and a second auxiliary icon indicating the severity of contamination (e.g., the situation in which a contaminated region is expanding or in which the cleanliness is very low) may be displayed near the main icon. In addition, the size of the main icon may be changed depending on the size of the contaminated region. In addition, the color of the main icon may be changed depending on the cleanliness. For example, a blue main icon may indicate high cleanliness, a yellow main icon may indicate intermediate cleanliness, and a red main icon may indicate low cleanliness. However, this is merely illustrative, and the present disclosure is not limited thereto.

Accordingly, in the case in which a region contaminated by liquid having an intermediate contamination level and a strong odor is expanding, the icon 810 may have the shape shown in FIG. 8(b).

In addition, the guidance information may further include a contaminated region. This will be described below with reference to FIG. 9.

Figure 9:
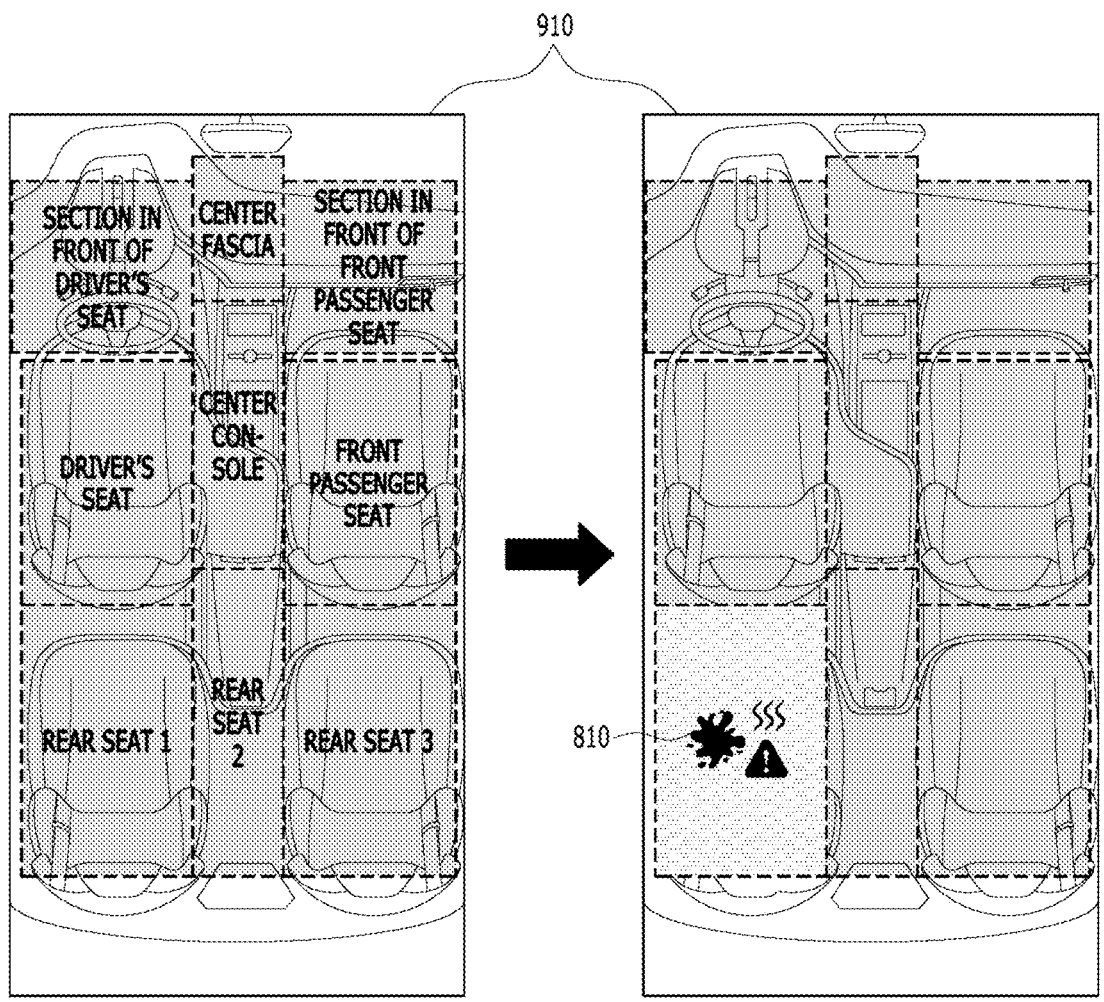
FIG. 9 shows an example of cleanliness-based guidance information for each section according to an embodiment of the present disclosure.

FIG. 9 shows an example of cleanliness-based guidance information for each section according to an embodiment of the present disclosure.

Referring to the left drawing in FIG. 9, the indoor region 910 of the vehicle included in the guidance information may be divided into nine sections, namely, the section in front of the driver's seat (e.g., the steering wheel, the dashboard in front of the driver's seat, the region around the pedal, etc.), the center fascia, the section in front of the front passenger seat (e.g., the glove compartment, the dashboard in front of the front passenger seat, the mat in front of the front passenger seat, etc.), the driver's seat, the center console, the front passenger seat, the rear seat 1, the rear seat 2, and the rear seat 3. As shown in the right drawing in FIG. 9, the controller 140 may display the icon 810, described above with reference to FIG. 8, in the section in which contamination is detected so that the occupant may intuitively recognize which section is contaminated. In addition to the icon 810, a predetermined visual effect (e.g., warning coloration) may be further applied to the section in which contamination is detected.

The present disclosure may be implemented as code that can be written on a computer-readable recording medium and thus read by a computer system. The computer-readable recording medium includes all kinds of recording devices in which data that may be read by a computer system are stored. Examples of the computer-readable recording medium include a Hard Disk Drive (HDD), a Solid-State Disk (SSD), a Silicon Disk Drive (SDD), a Read-Only Memory (ROM), a Random Access Memory (RAM), a Compact Disk ROM (CD-ROM), a magnetic tape, a floppy disc, and an optical data storage.

As is apparent from the above description, a vehicle according to at least one embodiment of the present disclosure configured as described above is capable of determining an indoor contaminated region in various manners and analyzing the contamination level.

In addition, it is possible to induce a user to clean the vehicle at the end of use thereof by applying information on detected indoor contamination to the reputation of the user.

However, the effects achievable through the disclosure are not limited to the above-mentioned effects, and other effects not mentioned herein will be clearly understood by those skilled in the art from the above description.

It will be apparent to those skilled in the art that various changes in form and details may be made without departing from the spirit and essential characteristics of the disclosure set forth herein. Accordingly, the above detailed description is not intended to be construed to limit the disclosure in all aspects and to be considered by way of example. The scope of the disclosure should be determined by reasonable interpretation of the appended claims and all equivalent modifications made without departing from the disclosure should be included in the following claims.

What is claimed is:

1. A method of managing cleanliness of an interior of a vehicle, the method comprising:
   detecting an indoor contamination using a contamination detector comprising at least a camera;
   analyzing, by a controller, an indoor cleanliness based on a result of the detecting; and
   outputting, by an output unit, guidance information based on the analyzed indoor cleanliness,
   wherein detecting the indoor contamination comprises:
   detecting at least one object in an indoor region of the vehicle subjected to contamination detection; and
   detecting whether contamination has occurred in the indoor region subjected to contamination detection other than a region in which the at least one object is detected.

2. The method according to claim 1, further comprising: acquiring initial environment information before detecting the indoor contamination.

3. The method according to claim 2, wherein the initial environment information comprises an image of the indoor region subjected to contamination detection captured before contamination is detected therein or an image of the indoor region subjected to contamination detection captured before an occupant gets in the vehicle after an end of a previous trip.

4. The method according to claim 2, wherein the initial environment information is acquired from an external server.

5. The method according to claim 2, wherein the camera comprises a spectroscopic sensor, and
   wherein detecting the indoor contamination comprises determining a region in which a wavelength different from a wavelength for each region recorded in the initial environment information is detected.

6. The method according to claim 2, wherein detecting the at least one object comprises:
   comparing the initial environment information with an image captured by the camera.

7. The method according to claim 1, wherein detecting the indoor contamination and analyzing the indoor cleanliness are re-performed periodically or when a size of a contaminated region increases.

8. The method according to claim 1, wherein analyzing the indoor cleanliness is performed based on at least one of a type of a contaminant, a size of a contaminated region, an odor, a material of a contaminated region, or an elapsed time since contamination.

9. The method according to claim 1, further comprising:
determining a final cleanliness after an end of a trip; and
transmitting the final cleanliness to at least one of a preset server or a terminal carried by an occupant.

10. A non-transitory computer-readable recoding medium containing a program configured to perform the method of managing cleanliness of the interior of the vehicle according to claim 1.

11. A device for managing cleanliness of an interior of a vehicle, the device comprising:
a contamination detector comprising at least a camera;
a controller configured to determine an indoor contamination based on information acquired through the contamination detector and to analyze an indoor cleanliness based on a result of determination; and
an output unit configured to output guidance information based on the analyzed indoor cleanliness,
wherein the controller detects at least one object in an indoor region of the vehicle subjected to contamination detection and determines whether contamination has occurred in the indoor region subjected to contamination detection other than a region in which the at least one object is detected.

12. The device according to claim 11, wherein the controller acquires initial environment information before determining the indoor contamination.

13. The device according to claim 12, wherein the initial environment information comprises an image of the indoor region subjected to contamination detection captured before contamination is detected therein or an image of the indoor region subjected to contamination detection captured before an occupant gets in the vehicle after an end of a previous trip.

14. The device according to claim 12, wherein the initial environment information is acquired from an external server.

15. The device according to claim 12, wherein the camera comprises a spectroscopic sensor, and
wherein the controller determines a region in which a wavelength different from a wavelength for each region recorded in the initial environment information is detected to determine the indoor contamination.

16. The device according to claim 12, wherein the controller compares the initial environment information with an image captured by the camera to detect the at least one object.

17. The device according to claim 11, wherein the controller re-performs detection of the indoor contamination and analysis of the indoor cleanliness periodically or when a size of a contaminated region increases.

18. The device according to claim 11, wherein the controller analyzes the indoor cleanliness based on at least one of a type of a contaminant, a size of a contaminated region, an odor, a material of a contaminated region, or an elapsed time since contamination.

19. The device according to claim 11, further comprising:
a communicator,
wherein the controller determines a final cleanliness after an end of a trip and transmits the final cleanliness to at least one of a preset server or a terminal carried by an occupant through the communicator.

20. The device according to claim 11, wherein when at least a portion of the at least one object disappears, the controller re-performs detection of the indoor contamination and analysis of the indoor cleanliness with respect to a region in which the disappeared object was detected.

* * * * *